United States Patent
de Lima et al.

(10) Patent No.: US 10,320,595 B2
(45) Date of Patent: Jun. 11, 2019

(54) OPTIMIZED CORDIC FOR APSK APPLICATIONS

(71) Applicant: Instituto de Pesquisas Eldorado, Campinas, SP (BR)

(72) Inventors: Eduardo Rodrigues de Lima, Campinas (BR); Tiago Diadami Perez, Guarulhos (BR)

(73) Assignee: Instituto de Pesquisas Eldorado, Campinas-SP (BR)

( * ) Notice: Subject to any disclaimer, the term of this patent is extended or adjusted under 35 U.S.C. 154(b) by 0 days.

(21) Appl. No.: 16/010,490

(22) Filed: Jun. 17, 2018

(65) Prior Publication Data

US 2018/0375699 A1  Dec. 27, 2018

Related U.S. Application Data

(60) Provisional application No. 62/523,843, filed on Jun. 23, 2017, provisional application No. 62/527,734, filed on Jun. 30, 2017.

(51) Int. Cl.
*H04B 1/16* (2006.01)
*G06F 7/544* (2006.01)
*H04L 27/06* (2006.01)

(52) U.S. Cl.
CPC ............ *H04L 27/06* (2013.01); *G06F 7/5446* (2013.01); *H04B 1/16* (2013.01)

(58) Field of Classification Search
CPC ........ G06F 7/544; G06F 7/5446; G06F 7/598; H04B 1/16; H04L 27/06
See application file for complete search history.

(56) References Cited

U.S. PATENT DOCUMENTS

| | | | |
|---|---|---|---|
| 6,434,582 B1* | 8/2002 | Choe | G06F 7/5446 708/276 |
| 2007/0124352 A1* | 5/2007 | Wittig | G06F 7/4818 708/200 |
| 2011/0225222 A1* | 9/2011 | Gunwani | G06F 7/5446 708/209 |
| 2012/0265796 A1* | 10/2012 | Vontela | G06F 7/5446 708/440 |
| 2014/0164461 A1* | 6/2014 | Boehme | G06F 7/5446 708/441 |

* cited by examiner

*Primary Examiner* — David B Lugo
(74) *Attorney, Agent, or Firm* — André Grouwstra

(57) ABSTRACT

A reduced COordinate Rotation DIgital Computer (CORDIC) cell in a parallel CORDIC has an xy-path from x and y inputs to x and y outputs, and a z-path from a z-input to a z-output. Bit-shifts in the xy-path are hardwired. The z-path has a shortened adder/subtractor with a built-in or hardwired fixed parameter. Input bits from the z-input are split into most significant and least significant bits. The number of most significant bits equals the shortened adder/subtractor width. The most significant bits are input to the non-inverting inputs of the adder/subtractor for calculating the most significant z-output bits. The least significant bits are connected directly (or via buffers) from the z-input to the z-output.

20 Claims, 8 Drawing Sheets

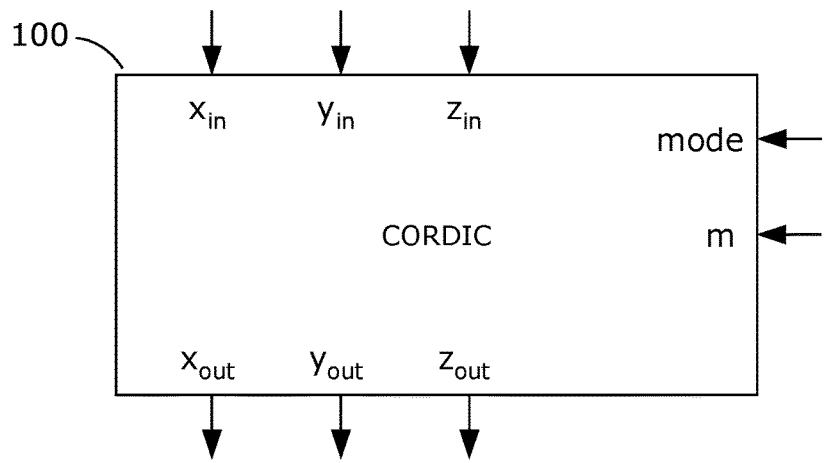
FIG. 1 – Prior Art
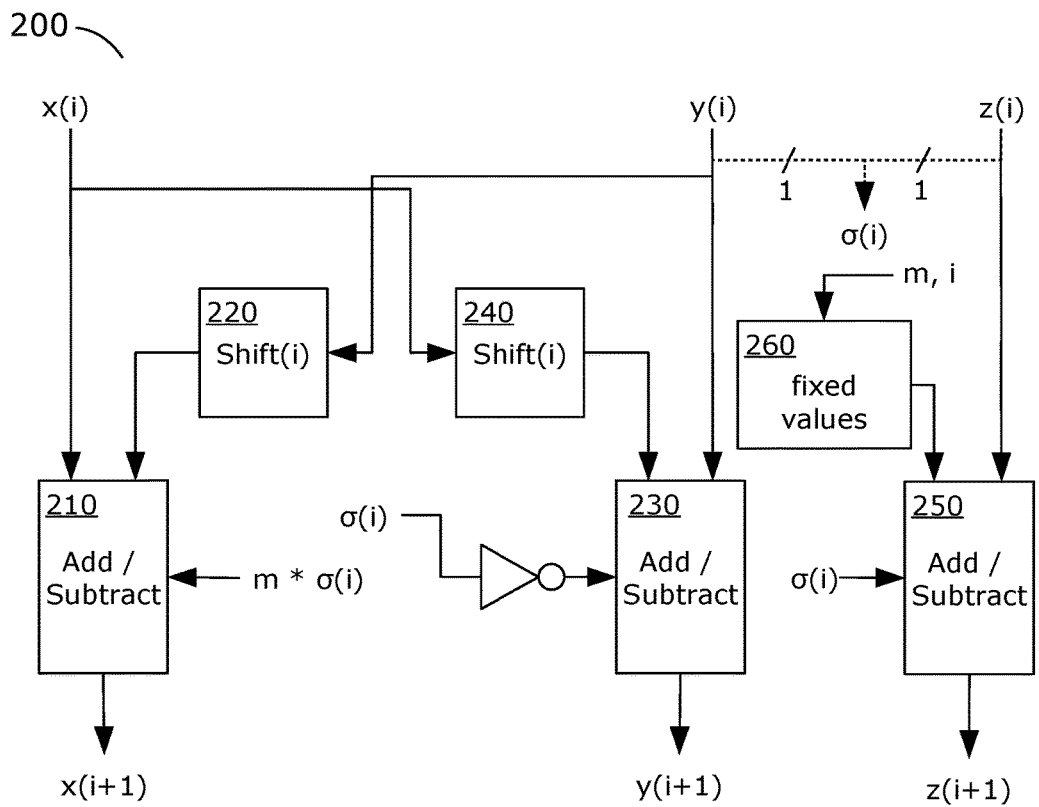
FIG. 2 – Prior Art

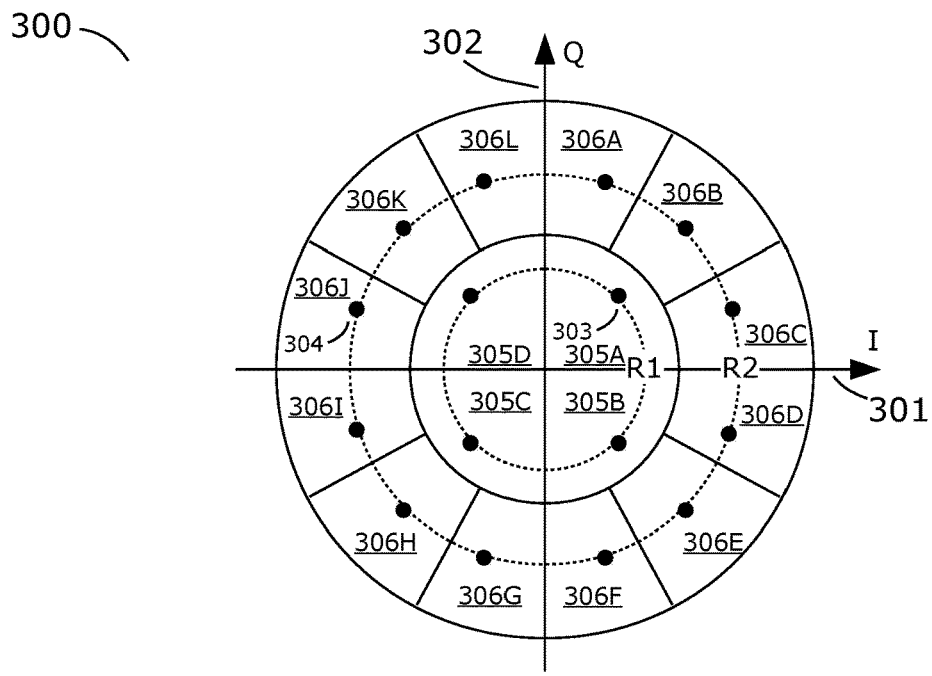
FIG. 3 – Prior Art
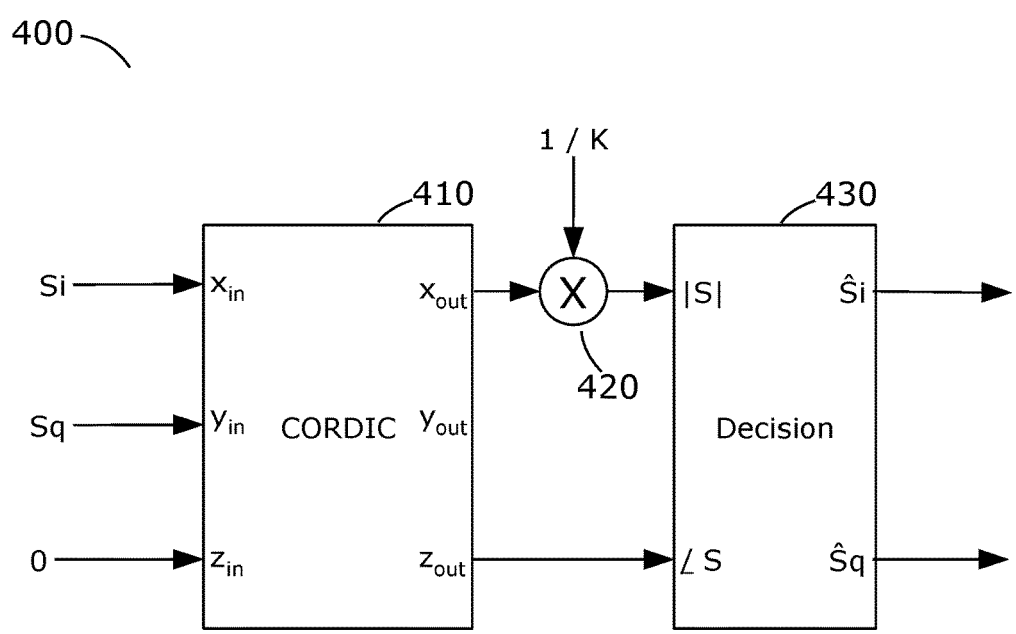
FIG. 4

1100

In a CORDIC cell, performing a vector micro-rotation by:

1110

Directly forwarding bits of x and y input signals to a first adder/subtractor and a second adder/subtractor to calculate x and y output bits, respectively

1120

Forwarding a first part of bits from a z input signal to a shortened adder/subtractor, and a second part of the bits from the z input signal to a second part of bits from a z output signal

1130

In the shortened adder/subtractor, adding or subtracting bits of a truncated rounded fixed parameter to or from the first part of the bits from the z input signal to calculate a first part of the bits from the z output signal

FIG. 11

OPTIMIZED CORDIC FOR APSK APPLICATIONS

CROSS REFERENCES TO RELATED APPLICATIONS

This application claims priority from U.S. Provisional Patent Application Ser. No. 62/523,843, entitled Optimized CORDIC for APSK Applications, filed on Jun. 23, 2017, which is hereby incorporated by reference as if set forth in full in this application for all purposes, and from U.S. Provisional Patent Application Ser. No. 62/527,734, entitled Optimized CORDIC for APSK Applications, filed on Jun. 30, 2017, which is hereby incorporated by reference as if set forth in full in this application for all purposes.

BACKGROUND

The present invention is in the field of signal processing and methods for telecommunication, robotics, and control systems. The invention may be implemented in a semiconductor chip. The invention can be used, for example, in digital radio receiver hard and soft demappers such as may be present in a decision feedback equalizer, a frequency error estimator, and a phase error estimator, as well as in multiple-input multiple-output (MIMO) wireless receivers.

A digital radio receiver that receives a single-frequency modulated digital signal, for example an amplitude and phase-shift keying (APSK) signal, needs to interpret a received symbol's amplitude and phase, while the signal may be distorted by noise, echoes, fading, interference, non-linear distortion, and other undesired influences. Prior to and while interpreting the amplitude and phase, the radio receiver aligns the signal's frequency, and the symbol's timing.

A digital radio's receive signal typically enters the digital domain at one (intermediate frequency (IF) or low IF) or a pair (zero-IF/baseband) of analog-to-digital converters (ADCs) that may sample a first signal in-phase (I) with, and a second signal in quadrature (Q) to the received signal's radio-frequency (RF) carrier. The radio synchronizes the frame, the frequency, and the timing of the received signal, followed by equalization. The synchronized and equalized digital I and Q signals are then jointly offered to a demapper, that interprets the received signal as encoding one of a limited set of symbols. For example, a 4+12APSK modulation scheme may encode a total of 16 symbols into 4 constellation points in a first ring, of 4 phases, each 90 degrees apart, at a first amplitude level, and 12 constellation points in a second ring, of 12 phases, each 30 degrees apart, at a second amplitude level. The 16 constellation points encircle the origin of the I and Q plane of the corrected received digital signal, and the demapper decides for any pair of I and Q values which of the 16 symbols it is mostly likely to encode.

Radio receivers may employ hard demappers and/or soft demappers. Hard demappers are relatively simple, and they output bits identifying the most likely received symbol. Soft demappers are more complex, as they also output the distance between the received signal and the identified symbol, or multiple pairs of symbols and distance, or of symbols and likelihoods, where a likelihood may be inversely proportional with the distance. A demapper needs to perform one or more rectangular-to-polar conversions to translate a signal from the IQ (rectangular) domain to the phase and amplitude (polar) domain, where a vector to a constellation point in the rectangular IQ domain has an angle with the positive I-axis denoting the phase and a length denoting the amplitude in the polar domain.

A circuit capable of rectangular-to-polar conversion and very suitable for integration into a semiconductor chip is the coordinate rotation digital computer (CORDIC), first proposed by Jack E. Volder, "The CORDIC Trigonometric Computing Technique", IRE Transactions on Electronic Computing, pp. 330-334, IRE/IEEE (1959). The CORDIC is a digital signal processor (DSP) dedicated to trigonometric calculations. A number of such calculation routines are known as "CORDIC algorithms", and they can be configured by controlling input values of one or more CORDIC pins.

FIG. 1 illustrates a typical outline of a CORDIC 100. CORDIC 100 has inputs $x_{in}$, $y_{in}$, $z_{in}$ and outputs $x_{out}$, $y_{out}$, and $z_{out}$. These interfaces may be used, for example, for two-dimensional input and output vectors $\{(0, 0) (x_{in}, y_{in})\}$ and $\{(0, 0) (x_{out}, y_{out})\}$, or for similar three-dimensional input and output vectors, or for input and output signals in the polar domain, etc. CORDIC 100 may further have an input m to select a coordinate system and a mode input to select between a vectoring mode and a rotation mode. CORDIC 100 may comprise one or more CORDIC cells with the same interfaces. If CORDIC 100 comprises a single CORDIC cell, it uses the cell iteratively to perform a CORDIC algorithm, feeding back output signals of one iteration as input signals for the next iteration. Alternatively, CORDIC 100 may be "parallelized", and comprise a concatenation of multiple stages of each one CORDIC cell whose output signals feed the inputs of the next CORDIC cell. A CORDIC may further be pipelined to increase throughput.

Like any DSP, a CORDIC's quality metrics are its (1) accuracy, for example expressed as its bit width; (2) throughput, for example expressed as operations per second; (3) latency, for example expressed in seconds or in clock cycles; (4) power, for example expressed in W or W/operation; and (5) die area occupied in a semiconductor chip. In case of a digital radio demapper, all five quality metrics are important. To achieve a low latency and a high throughput, a CORDIC performing the demapper function needs to be parallelized, which compromises die area and power. Therefore, there is a need to reduce die area and power in a parallel CORDIC, without sacrificing accuracy, throughput, or latency.

A CORDIC cell performs a clockwise rotation over a positive angle $\alpha$ of a vector $\{(0, 0) (x1, y1)\}$, based on the trigonometric formulas:

$$x2 = x1 * \cos(\alpha) + y1 * \sin(\alpha)$$

$$y2 = y1 * \cos(\alpha) - x1 * \sin(\alpha)$$

Or counter-clockwise:

$$x2 = x1 * \cos(\alpha) - y1 * \sin(\alpha)$$

$$y2 = y1 * \cos(\alpha) + x1 * \sin(\alpha)$$

This can be reduced to a single set of equations by introducing the sign $\sigma$, where $\sigma = 1$ for clockwise rotation and $\sigma = -1$ for counter-clockwise rotation:

$$x2 = x1 * \cos(\alpha) + \sigma * y1 * \sin(\alpha)$$

$$y2 = y1 * \cos(\alpha) - \sigma * x1 * \sin(\alpha)$$

Volder reduced the number of multiplications by dividing all members of the equation by $\cos(\alpha)$, thereby allowing his rotated vector to increase in length by a factor of $1/\cos(\alpha)$:

$$x2'=x2/\cos(\alpha)=x1+\sigma^*y1^*\tan(\alpha)$$

$$y2'=y2/\cos(\alpha)=y1-\sigma^*x1^*\tan(\alpha)$$

Lastly, Volder enabled simple digital implementation by allowing only angles $\alpha$ for which $\tan(\alpha)$ has simple digital values $\tan(\alpha)=1$, ½, ¼, ⅛, 1/16, etc., or more generally, $\tan(\alpha)=2^{-i}$, with i=0, 1, 2, 3, etc. This forms a series of available angles $\alpha_i=\arctan(2^{-i})=45°$, 26.565°, 14.036°, 7.125°, 3.576°, etc. For these available angles $\alpha_i$, multiplication with $\tan(\alpha_i)$ is effectively a right-shift over i bits of the input value. To allow for rotation over any arbitrary angle, the arbitrary angle must be de-composed into the available angles $\alpha_i$, and the CORDIC cell must be used repeatedly to perform micro-rotations using only the available angles. Alternatively, a parallelized chain of CORDIC cells can perform the series of micro-rotations quasi-simultaneously.

Many researchers and developers have followed in Volder's footsteps to further develop CORDIC architectures and algorithms. Current architectures support two operating modes: rotation mode (as described above) and vectoring mode, where a vector's length and angle $\alpha$ with the positive x-axis are computed by performing a binary search for a series of micro-rotations that rotate the vector to the x-axis, such that the resulting x-coordinate equals the vector's length (to be corrected for the CORDIC gain due to the series of micro-rotations), the y-coordinate equals zero, and the sum of the micro-rotations equals $-\alpha$. They also support three coordinate systems, using the parameter m, where m=0 for the rectangular, m=1 for the circular, and m=-1 for the hyperbolic coordinate system. Volder's original work supported two-dimensional coordinates, but current CORDICs support three dimensions. Its CORDIC cell equations are:

$$x2'=x1+m^*\sigma^*2^{-i*}y1$$

$$y2'=y1-\sigma^*2^{-i*}x1$$

$$z2=z1-\sigma^*\arctan(2^{-i}) \text{ (for } m=1\text{, polar coordinates)}$$

$$z2=z1-\sigma^*2^{-i} \text{ (for } m=0\text{, rectangular coordinates)}$$

$$z2=z1-\sigma^*\arctan h(2^{-i}) \text{ (for } m=-1\text{, hyperbolic coordinates)}$$

FIG. 2 illustrates a conventional CORDIC cell 200. CORDIC cell 200 takes the output values x(i), y(i), and z(i) from iteration i or stage i. It determines sign bit $\sigma(i)$ from either the y(i) or z(i) value, and performs iteration i+1 to calculate x(i+1), y(i+1), and z(i+1). The value of sign bit $\sigma(i)$ depends on usage in vector mode ($\sigma(i)=-\text{sign}(y(i))$) or in rotation mode ($\sigma(i)=\text{sign}(z(i))$). Bit-shifter 220 right-shifts input signal y(i) by i bits, an operation that is equal to dividing y(i) by $2^i$. Adder/subtractor 210 adds this result to x(i) if $m^*\sigma(i)=1$, or subtracts this result from x(i) if $m^*\sigma(i)=0$. In this manner, adder/subtractor 210 and bit-shifter 220 perform the above function $x2=x1+m^*\sigma^*2^{-i*}y1$. Likewise, bit-shifter 240 right-shifts input signal x(i) by i bits, and adder/subtractor 230 subtracts this result from y(i) if $\sigma(i)=1$, or adds this result to y(i) if $\sigma(i)=0$. In this manner, adder/subtractor 230 and bit-shifter 240 perform the above function $y2=y1-\sigma^*2^{-i*}x1$. Adder/subtractor 250 takes the fixed value $\arctan(2^{-i})$ or $2^{-i}$ or $\arctan h(2^{-i})$, dependent on the selected coordinate system and the iteration only, and adds it to or subtracts it from the value z(i) to obtain z(i+1).

Previous versions of parallelized CORDICs have attempted to simplify part of the parallel stages and thereby reduce semiconductor die area or to reduce latency. For example, Tso-Bing Juang, et al., in "Para-CORDIC: Parallel CORDIC Rotation Algorithm", IEEE Transactions on Circuits and Systems I, pp. 1515-1524, August 2004, proposed an architecture with low latency and high accuracy, but it consumed a large die area. Shaoyun Wang, et al., in "Hybrid CORDIC Algorithms", IEEE Transactions on Computers, pp. 1202-1207, November 1997, proposed a pipelined CORDIC that reduced the number of constants to store. They achieved a great reduction in area but introduced inaccuracies that may prevent their CORDIC from being used in some communication applications. The present invention overcomes the prior art problems, and balances low latency and high accuracy within a small die area.

SUMMARY

A digital radio receiver that receives a single-frequency modulated digital signal, for example an amplitude and phase-shift keying (APSK) signal, has a need to interpret a received symbol's amplitude and phase, wherein the signal may be distorted by noise, echoes, fading, interference, and other undesired influences. To be able to interpret the amplitude and phase, the radio receiver must have accurate knowledge of the signal's frequency, and the symbol's timing. A digital radio's receive signal typically enters the digital domain at one (intermediate frequency (IF) or low IF) or a pair (zero-IF/baseband) of analog-to-digital converters (ADCs) that may sample a first signal in-phase (I) with, and a second signal in quadrature (Q) to the received signal's radio-frequency (RF) carrier. The radio synchronizes the frame, the frequency, and the timing of the received signal, followed by equalization. The synchronized and equalized digital I and Q signals can then jointly be offered to a demapper, that interprets the received signal as encoding one of a limited set of symbols. A circuit capable of the required rectangular-to-polar conversion and very suitable for integration into a semiconductor chip is the coordinate rotation digital computer (CORDIC). Like any DSP, a CORDIC's quality metrics are its (1) accuracy, for example expressed as its bit width; (2) throughput, for example expressed as operations per second; (3) latency, for example expressed in seconds or in clock cycles; (4) power, for example expressed in W or W/operation; and (5) die area occupied in a semiconductor chip. In case of a digital radio demapper, all five quality metrics are important. Embodiments of the present invention achieve good results for all these metrics simultaneously.

An embodiment of the invention implements a parallel CORDIC whose CORDIC cells implement hard-wired bit-shifters, and hardwired fixed parameter values. Fixed parameter values are truncated to values that allow for sufficient accuracy to obtain a low bit-error rate (BER) in communications applications. Adder/subtractors are shortened to coincide with the truncated fixed parameter values, allowing further reduction in die area and reducing the number of adder/subtractor stages that lead to latency.

In a first aspect, embodiments of the invention offer a CORDIC with a first bit-width. The CORDIC includes multiple stages of three-dimensional CORDIC cells capable of performing vector rotation. At least one of the CORDIC cells is a reduced CORDIC cell. It has an xy-path and a z-path. The xy path has hard-wired bit-shifts. The z-path has a fixed parameter which is truncated to a second bit width, smaller than the first bit-width. The z-path includes a adder/ subtractor that is shortened to the second bit-width. The truncated fixed parameter is included in, or hardwired into, the shortened adder/subtractor. The z-input word is split in two. Its most significant bits (second bit-width) are coupled with non-inverting inputs of the shortened adder/subtractor. Shortened adder/subtractor output bits are coupled with the most significant bit outputs of the z-output word. The remaining least significant bits of the z-input word are coupled directly with the remaining least significant bits of the z-output word.

In a second aspect, embodiments of the invention offer a method to perform a vector micro-rotation in a CORDIC cell. The method includes the steps of: directly forwarding bits of x-input and y-input signals to a first adder/subtractor and a second adder/subtractor to calculate x-output and y-output bits, respectively; splitting the z-input signal bits in two and forwarding the most significant bits to a shortened adder/subtractor and the least significant bits directly to z-output bits; and in the shortened adder/subtractor, adding or subtracting bits of a truncated fixed parameter from the most significant bits of the z-input to calculate the most significant bits of the z-output.

A further understanding of the nature and the advantages of particular embodiments disclosed herein may be realized by reference of the remaining portions of the specification and the attached drawings.

BRIEF DESCRIPTION OF THE DRAWINGS

The invention will be described with reference to the drawings, in which:

FIG. 1 illustrates a typical outline of a CORDIC;

FIG. 2 illustrates a conventional CORDIC cell;

FIG. 3 illustrates an example 16-APSK constellation;

FIG. 4 illustrates an example demapper utilizing a CORDIC for rectangular to polar conversion;

FIG. 11 illustrates a method to perform a vector micro-rotation in a CORDIC cell according to an embodiment of the invention.

DETAILED DESCRIPTION

Introduction

Figure 5:
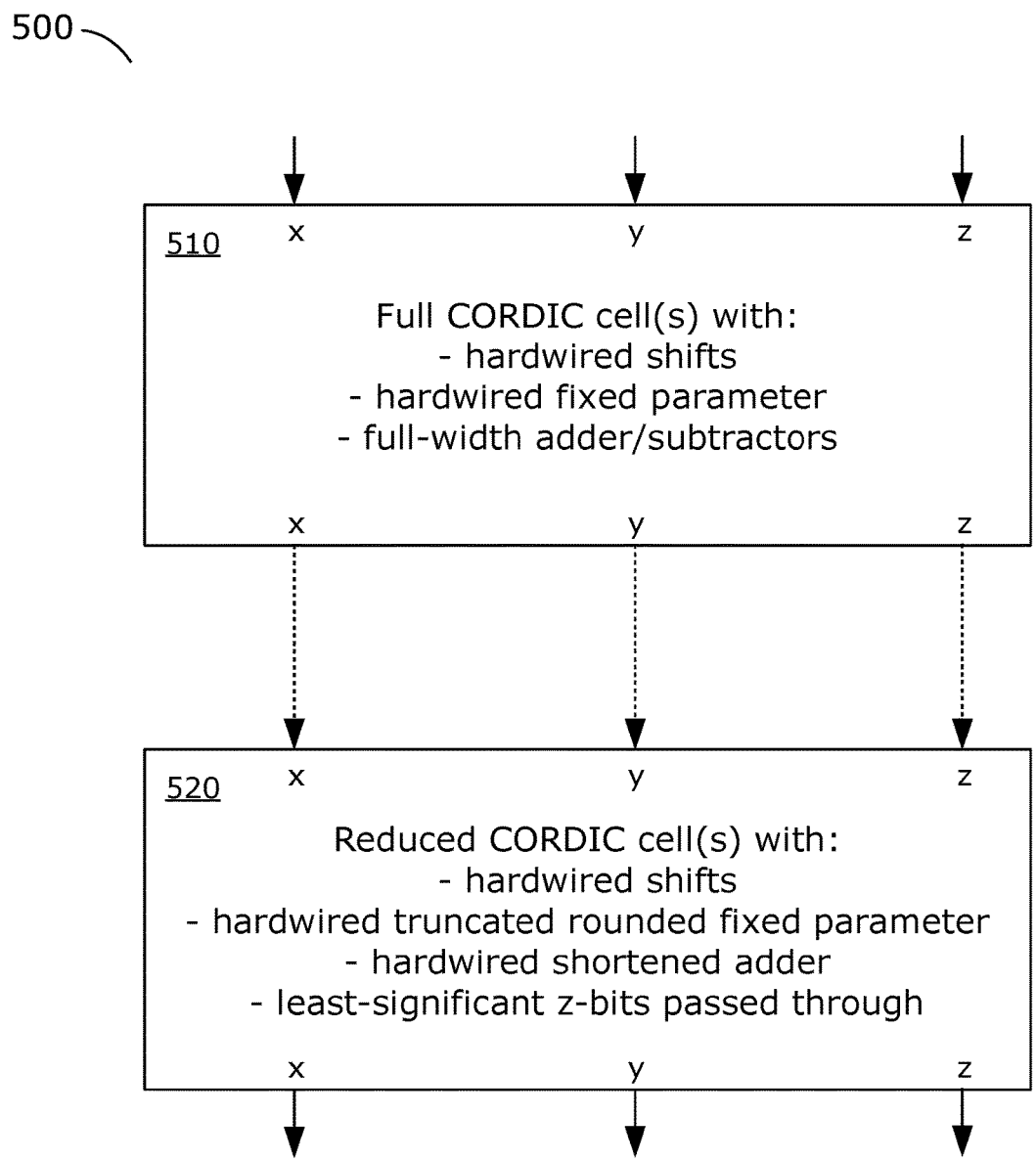
FIG. 5 illustrates an optimized parallel CORDIC according to an embodiment of the invention.

A digital radio receiver that receives a single-frequency modulated digital signal, for example an amplitude and phase-shift keying (APSK) signal, must interpret a received symbol's amplitude and phase, wherein the signal may be distorted by noise, echoes, fading, interference, and other undesired influences. A digital radio's receive signal typically enters the digital domain at one (intermediate frequency (IF) or low IF) or a pair (zero-IF/baseband) of analog-to-digital converters (ADCs) that may sample a first signal in phase (I) with, and a second signal in quadrature (Q) to the received signal's radio-frequency (RF) carrier. The radio synchronizes the frame, the frequency, and the timing of the received signal, followed by equalization. The synchronized and equalized digital I and Q signals are then jointly offered to a demapper, that interprets the received signal as encoding one of a limited set of symbols. A circuit capable of performing the required rectangular-to-polar conversion and very suitable for integration into a semiconductor chip is the coordinate rotation digital computer (CORDIC). Like any DSP, a CORDIC's quality metrics are its (1) accuracy, for example expressed as its bit width; (2) throughput, for example expressed as operations per second; (3) latency, for example expressed in seconds or in clock cycles; (4) power, for example expressed in W or W/operation; and (5) die area occupied in a semiconductor chip. In case of a digital radio demapper, all five quality metrics are important. Embodiments of the invention achieve good results for all these metrics simultaneously.

FIG. 3 illustrates an example 16-APSK constellation 300. A digital transmitter transmits symbols whose amplitude and phase, as related to the phase of radio-frequency carrier, can be expressed as constellation points in the rectangular coordinate system with in-phase components I (301) and quadrature components Q (302). Constellation points 303 lie on a first ring with amplitude R1 around the coordinate system origin, and constellation points 304 lie on a second ring, with amplitude R2, around the coordinate system origin. There are a total of 16 constellation points, four on the first ring R1 and twelve on the second ring R2. Even after a radio receiver has performed time and frequency synchronization, individual received constellation points may have an amplitude and phase that differs from the transmitted values, due to noise, echoes, fading, interference, and other undesired influences. The radio receiver needs to decide on the most likely original values of a received symbol's I and Q parameters, and thereby on the most likely symbol that was transmitted. The radio receiver uses a demapper for this decision. The demapper may, for example, define pie sections 305A-D in the coordinate system as areas where transmitted constellation points 303 would most likely be received, and partial pie sections 306A-L as areas where transmitted constellation points 304 would most likely be received. To know in which pie section a received symbol is located, the demapper needs to calculate the received symbol's amplitude and phase from the received symbol's values along the I 301 and Q 302 axes in a rectangular-to-polar conversion. A CORDIC can perform this conversion.

FIG. 4 illustrates an example demapper 400 utilizing a CORDIC 410 for rectangular-to-polar conversion. Demapper 400 uses CORDIC 410 in vector mode in the circular coordinate system (m=1). The demapper 400 receives the radio receiver's received values Si and Sq and forwards those to the CORDIC 410 $x_{in}$ and $y_{in}$ inputs. The $z_{in}$ input receives a value 0, which may be hard-wired. At its $x_{out}$ output, CORDIC 410 delivers the received symbol's amplitude, which needs to be corrected for the CORDIC 410 gain K, which may be either explicitly performed by optional multiplier 420, or implicitly performed in decision logic 430. At its $z_{out}$ output, CORDIC 410 delivers the received symbol's angle (its phase). Decision logic 430, which may comprise, for example, twelve digital comparators to distinguish 12 phase ranges for the received phase /S, and a comparator to distinguish 2 amplitude ranges for the received amplitude |S|, and to decide in which section 305A-D or 306A-L the received symbol lies, and therefore what the most likely transmitted values Ŝi and Ŝq were.

An Optimized Parallel CORDIC

FIG. 5 illustrates an optimized parallel CORDIC 500 according to an embodiment of the invention. Parallel CORDIC 500 may comprise zero or more instances of a full CORDIC cell 510 and at least one reduced CORDIC cell 520. If one exists, a full CORDIC cell 510 precedes the instances of reduced CORDIC cell 520. A full CORDIC cell 510 includes hardwired bit-shifters, a hardwired fixed parameter, and full-width adders/subtractors. More details are presented with reference to FIG. 6. A reduced CORDIC cell 520 includes hardwired bit-shifters, a hardwired truncated rounded fixed parameter, a shortened adder/subtractor in the z-path, and least-significant z-bits are passed through from input to output. More details are presented with reference to FIG. 7.

In parallel CORDIC 500, each full CORDIC cell 510 and each reduced CORDIC cell 520 is dedicated to one fixed stage of a CORDIC algorithm, and therefore its bit-shift will not vary. The embodiment uses only wire connections to route the correct bits from x and y data inputs to the applicable adder/subtractors.

Figure 6:
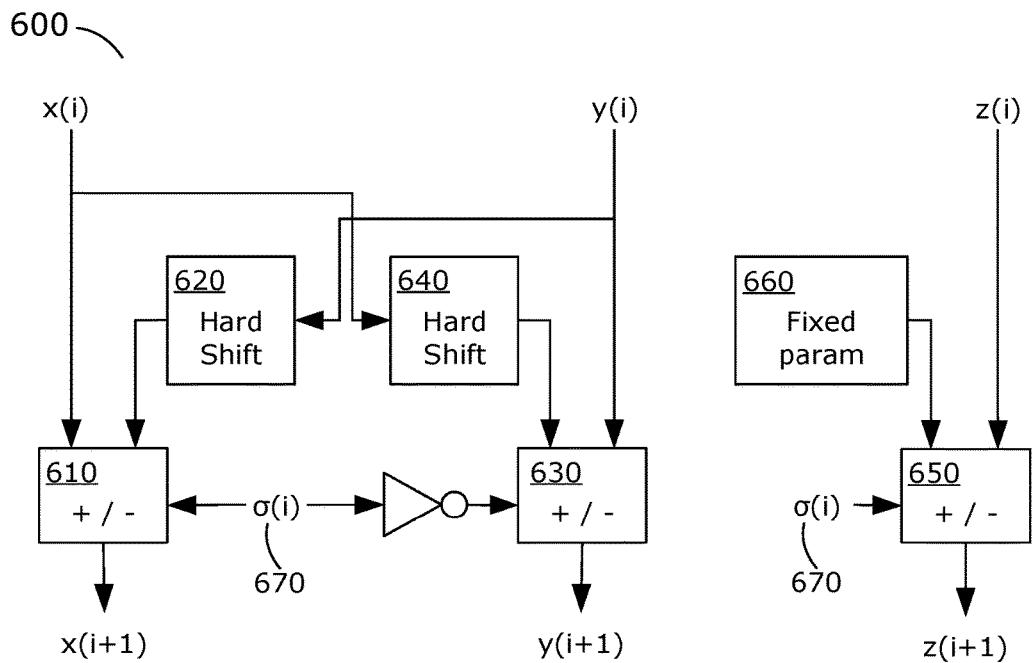
FIG. 6 illustrates a full CORDIC cell according to an embodiment of the invention.

FIG. 6 illustrates a full CORDIC cell 600 according to an embodiment of the invention. Both adder/subtractor 610 and adder/subtractor 630 receive their input bits directly from the x(i) and y(i) inputs. The embodiment right-shifts the bits of y(i) by i positions as input bits for adder/subtractor 610, and right-shifts the bits of x(i) by i positions as input bits for adder/subtractor 630. Thus, bit-shift 620 and bit shift 640 are hard-wired, and need not involve any logic gates. The xy-path, which runs from inputs x(i) and y(i) to outputs x(i+1) and y(i+1), need not have more logic than adder/subtractor 610, adder/subtractor 630 and an inverter for the sign bit σ(i) 670.

In the z-path, which runs from input z(i) to output z(i+1), the embodiment calculates z(i+1) from z(i) and a fixed parameter 660. The fixed parameter 660 value depends only on the coordinate system m. If the parallel CORDIC is specific for a demapper application, or similar, then m=1 (circular coordinates) and fixed parameter 660 has the value arctan($2^{-i}$). An embodiment for another application may use a different coordinate system, and have $2^{-i}$ or arctan h($2^{-i}$) for fixed parameter 660. In any case, fixed parameter 660 depends only on i. The embodiment hardwires fixed parameter 660 at the relevant input of adder/subtractor 650. An embodiment may tie 0-bits directly to a bit-level representing 0, such as ground, and 1-bits directly to a bit-level representing 1, such as VDD. Since there are no gates and memories involved in the (hardwired) bit-shift 620 and bit shift 640 and the (hardwired) fixed parameter 660, full CORDIC cell 600 is smaller than a conventional CORDIC cell and uses less power. Another embodiment, as will be explained with reference to FIG. 9B for a reduced CORDIC cell, may implement adder/subtractor 650 with full adder cells rather than full adder/subtractor cells, and hardwire the bits representing fixed parameter 660 by inputting the sign bit σ(i) 670 for 0 and the inverted sign bit σ(i) 670 for 1. Since a full adder cell is smaller than a full adder/subtractor cell, this implementation can be even smaller. Further embodiments may use any combinatorial logic that implements the same truth table as adder/subtractor 650 with bit inputs hardwired to logic levels representing a fixed parameter.

Figure 7:
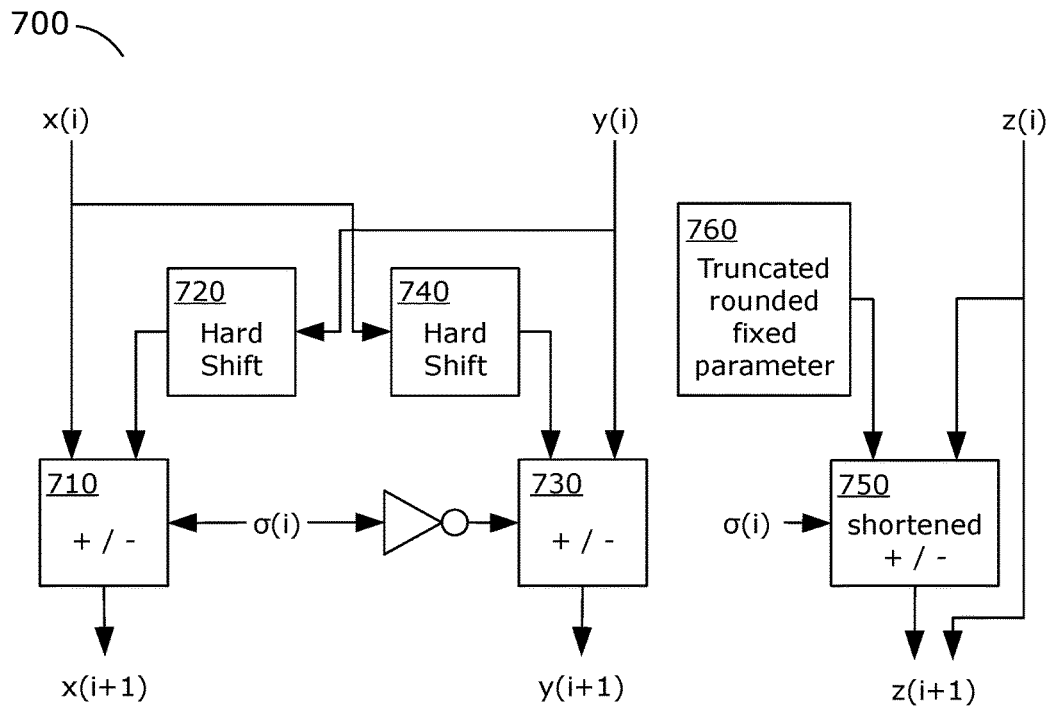
FIG. 7 illustrates a reduced CORDIC cell according to an embodiment of the invention.

FIG. 7 illustrates a reduced CORDIC cell 700 according to an embodiment of the invention. Reduced CORDIC cell 700 is similar to full CORDIC cell 600, and adder/subtractor 710, adder/subtractor 730, bit-shift 720, and bit-shift 740 are implemented in the same way as adder/subtractor 610, adder/subtractor 630, bit-shift 620 and bit shift 640. However, the z-path from input z(i) to output z(i+1) is different. The fixed parameter 760 to calculate z(i+1) is rounded and truncated. Rounding may be up, down, or to a nearest value of a required precision. In the case of rounding down, rounding and truncating may be performed in one step. In the case of rounding up, or rounding to the nearest value, rounding is performed before truncation. At least a part of fixed parameter 760's rounded value's least significant bits is removed, i.e., virtually replaced by zeroes. Least significant bits that are zero do not impact an addition or subtraction, therefore the embodiment directly wires related input bits from z(i) to z(i+1). The related sections of an adder/subtractor are redundant, and therefore the embodiment comprises a shortened adder/subtractor 750. For example, if the value of the original fixed parameter is 0010 1001 1001 0010, then the embodiment may implement a truncated rounded fixed parameter 760 with value 0010 1xxx xxxx xxxx. Of the original 16 bits, only 5 are used. The embodiment uses a shortened adder/subtractor 750 that comprises five full adder cells, or five full adder/subtractor cells. The five most significant bits of the input value z(i) are routed to the shortened adder/subtractor 750 to calculate the five most significant bits of z(i+1), and the remaining eleven least significant bits of z(i) are routed directly to the remaining eleven least significant bits of z(i+1). Since the reduced CORDIC cell 700 uses fewer adder/subtractor sections than a full CORDIC cell 600, it is even smaller and uses even less power. Some embodiments of reduced CORDIC cell 700 may truncate even more bits, for example the truncated rounded fixed parameter may be implemented as 001x xxxx xxxx xxxx. As yet another example, in a reduced CORDIC cell 700 that rounds up, or that rounds to the nearest value, the value of the original fixed parameter may be 0000 0011 1001 0101, which is rounded to 0000 0100 0000 0000 and truncated to 0000 01xx xxxx xxxx.

An example of rounding and truncated fixed parameters is as follows. In a demapper, a CORDIC rectangular-to-polar conversion. The CORDIC is used with m=1 (circular coordinates) and fixed parameter 660 has the value arctan($2^{-i}$). For small values of an angle α, the value of arctan(α) approaches α. Therefore, for i>>1, for example, i>5, arctan ($2^{-i}$)≈$2^{-i}$. A CORDIC embodiment for this example may use five instances of full CORDIC cell 600 for the initial five iterations, and twelve instances of reduced CORDIC cell 700 for the remaining iterations needed to achieve 16-bit precision. Each instance i of reduced CORDIC cell 700 may round the fixed parameter arctan($2^{-i}$) to the nearest number $2^{-i}$ with the required precision (also $2^{-i}$) to obtain a binary word consisting of a string of 0-bits, followed by a single 1-bit, followed by the least significant bits, another string of 0-bits. The least significant bits are truncated.

A further embodiment of the invention balances the latency of the shortened adder/subtractor in the z-path with the latency of the full-length adder/subtractors in the x and y-paths. Since the shortened adder/subtractor does not need to be faster than the full-length adder/subtractors, it can be implemented to run relatively slower, thereby further reducing the power it dissipates.

Generally, a reduced CORDIC cell 700 is less precise than a full CORDIC cell 600 or a conventional CORDIC cell. The reduced precision may result in an increase in, for example, the bit-error-rate (BER) in a digital radio receiver. A good radio designer will determine a radio system's BER sensitivity to a planned truncation before implementing it.

Hard-Wired Bit-Shift

Figure 8A:
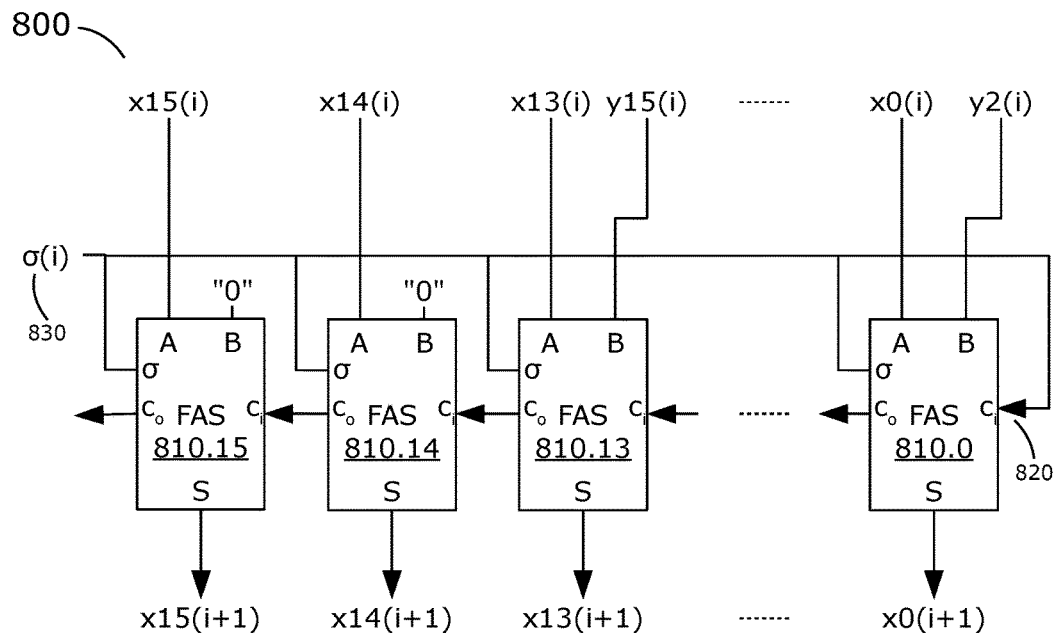
FIG. 8A-B illustrate details of the xy-path in a full or reduced CORDIC cell according to an embodiment of the invention.
Figure 8B:
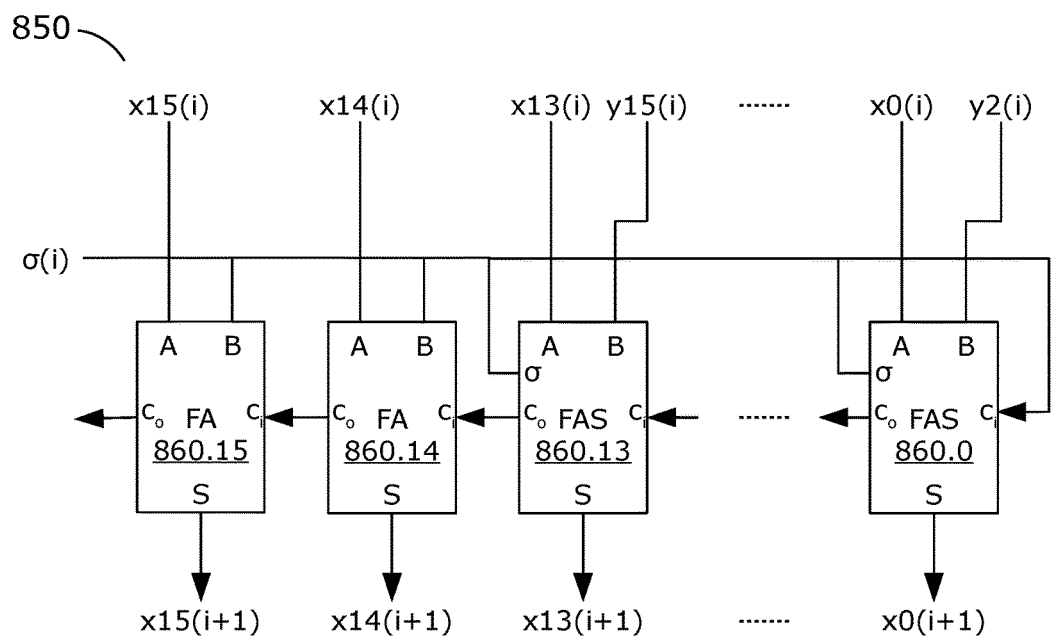

FIGS. 8A-B illustrate example details of the xy-path in a full or reduced CORDIC cell according to embodiments of the invention. FIG. 8A shows an embodiment 800 that implements adder/subtractor 610 and bit-shift 620 or adder/subtractor 710 and bit-shift 720 hard-wired, and using full adder/subtractor (FAS) cells only. Adder/subtractor 630, adder/subtractor 730, bit shift 640, and bit-shift 740 are implemented in a similar fashion. The adder/subtractor includes a chain of FAS cells 810.15-810.0 for an exemplary 16-bit CORDIC. Each FAS cell 810 is able to perform an add operation or a subtract operation for two's complement binary numbers, controlled by sign bit σ(i) 830. Sign bit σ(i) 830 is also provided to the carry input 820 of FAS cell 810.0. An example FAS cell will be provided with reference to FIG. 10. Each FAS cell 810 has a non-inverting input A, an invertible input B, a sign input σ for sign bit σ(i), a carry input $c_i$, a carry output $c_0$, and a sum output S.

FIG. 8A gives an example 2-bit shift, as is required in a stage-2 CORDIC cell. FAS cell 810.15 receives x15(i), i.e. the $15^{th}$ or most significant bit of x(i), on its non-inverting input A. Its invertible input B is hardwired to a logical 0, for example hardwired to ground. FAS cell 810.14 receives x14(i) on its non-inverting input A. Again, its invertible input B is hardwired to a logical 0. FAS cell 810.13 receives x13(i) on its non-inverting input A. However, its invertible input B receives, and is hardwired to, y15(i), i.e. the $15^{th}$ or most significant bit of y(i). Likewise, each subsequent FAS cell receives the related bit of x(i), and a right-shifted bit of y(i). Therefore, the rightmost FAS cell 810.0 receives bits x0(i) and y2(i). The sum outputs S of FAS cell 810.15 to FAS cell 810.0 provide the respective bits x15(i+1) to x0(i+1) of the x(i+1) output signal.

FIG. 8B shows an embodiment 850 that implements adder/subtractor 610 or adder/subtractor 710 partially with full adder (FA) cells. Full adder cells can be smaller than full adder/subtractor cells, and therefore this embodiment can be smaller than the embodiment of FIG. 8A. For the example 2-bit right-shift, this embodiment replaces the two leftmost, i.e., the two most significant, FAS cells with FA cells. A FA cell doesn't have a sign input σ for sign bit σ(i), and its B input is non-inverting just like its A input. FA cell 860.15 and FA cell 860.14 have their B input coupled with the sign bit σ(i). FAS cells 860.13-860.0 have their invertible B inputs hardwired to y15(i)-y2(i), respectively.

Whereas FIG. 8B shows a logic reduction of the circuit in FIG. 8A, where the truth tables of embodiments 800 and 850 are identical given the value i of the bit-shift, in general an embodiment may include any circuit that has been logically optimized, for example for latency, die area, power, etc., that implements the same truth table.

Hardwired and Truncated Rounded Fixed Parameter

Figure 9A:
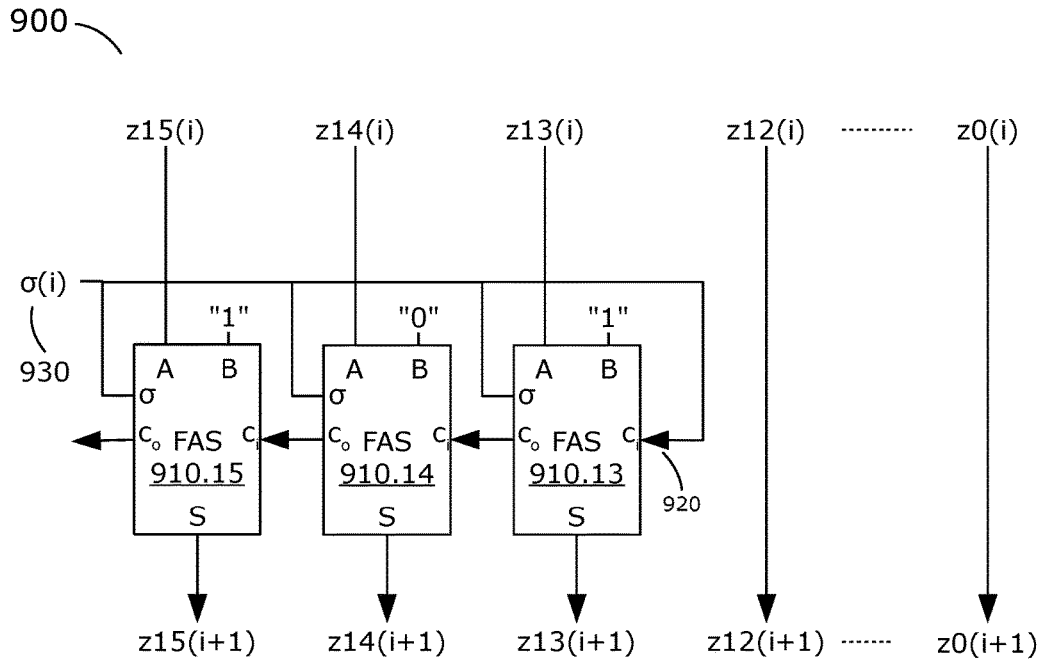
FIGS. 9A-B illustrate details of the z-path in a reduced CORDIC cell according to embodiments of the invention.
Figure 9B:
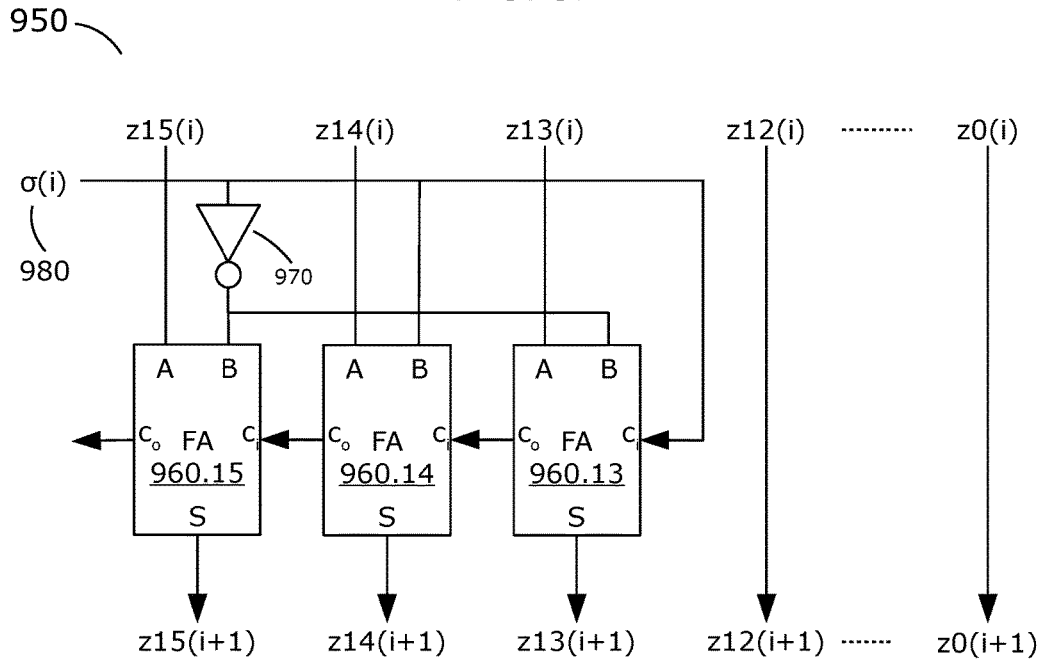

FIGS. 9A-B illustrate details of the z-path in a reduced CORDIC cell according to embodiments of the invention. Both figures provide an example embodiment of a 16-bit CORDIC, in which the fixed parameter is truncated to 3 bits. In this example, the fixed parameter original value may have been 1010 0001 1011 0111, and it was truncated to 101x xxxx xxxx xxxx. In other words, of its 16 bits, the three most significant bits are used and the remaining 13 are not implemented.

FIG. 9A shows an example reduced CORDIC cell 900 that comprises FAS cell 910.15 to FAS cell 910.13. Their non-inverting inputs A receive the three most significant bits z15(i)-z13(i) of the z(i) input word. Their invertible inputs B are hardwired to logic levels representing the values "1", "0", and "1" of the three most significant bits of the fixed parameter. Their sign inputs σ receive the sign bit σ(i) 930, and sign bit σ(i) 930 is also coupled with the carry input 920 of FAS cell 910.13. The sum outputs S of FAS cell 910.15 to FAS cell 910.13 provide the respective bits z15(i+1) to z13(i+1) of the z(i+1) output signal. The remaining output bits z12(i+1) to z0(i+1) are coupled with the input bits z12(i) to z0(i). This coupling may be direct, or through intermediate gates such as buffers.

FIG. 9B shows another example, in which reduced CORDIC cell 950 includes FA cell 960.15 to FA cell 960.13. This embodiment hardwires the fixed parameter in a different way. It is based on the logic equivalence of a FAS cell whose invertible input B is tied to a logic "0" with a FA cell whose B input receives the sign bit σ(i) 980. Similarly, if the invertible input B of the FAS cell would be tied to a logic "1", it is equivalent to an FA cell whose B input receives the inverted sign bit σ(i) 980. Therefore, FA cell 960.15 and FA cell 960.13 receive sign bit σ(i) 980 via inverter 970, whereas FA cell 960 receives sign bit σ(i) 980 directly at its B input.

Further embodiments may use any combination of the circuits in FIGS. 9A and 9B, and more generally, any combinatorial logic that implements the same truth table given a truncated rounded fixed parameter.

Figure 10A:
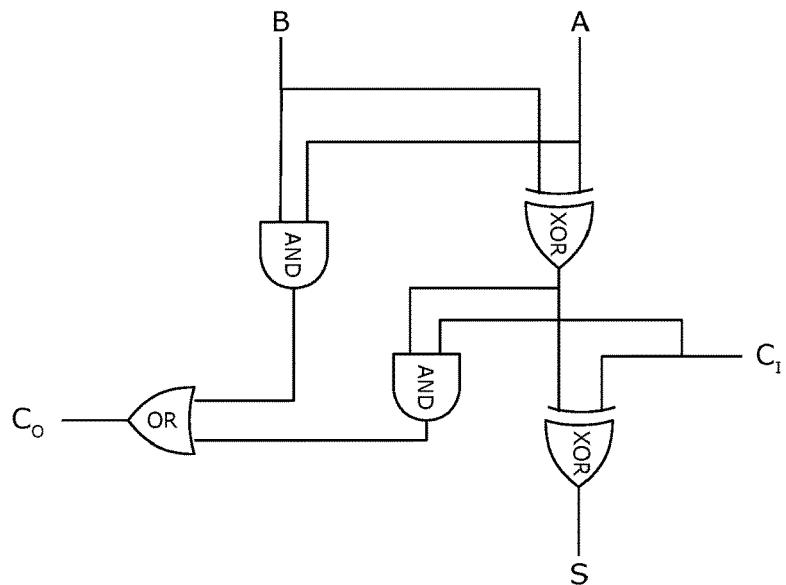
FIGS. 10A-B illustrate example circuits for a full adder and a full adder/subtractor according to some embodiments of the invention.
Figure 10B:
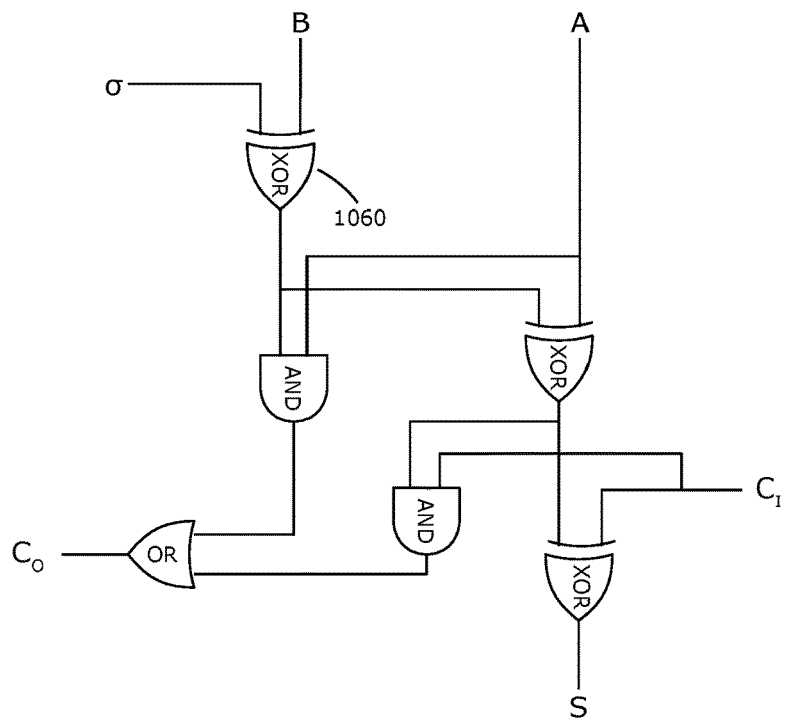

FIGS. 10A-B illustrate example circuits for a full adder and a full adder/subtractor according to some embodiments of the invention. FIG. 10A illustrates example full adder 1000 circuit according to some embodiments of the invention. Its inputs are A, B (both A and B are non-inverting) and $c_i$ (carry). Its outputs are S (the sum of A+B) and $c_0$ (carry). FIG. 10A implements the truth table:

| ci | A | B | co | S |
|---|---|---|---|---|
| 0 | 0 | 0 | 0 | 0 |
| 0 | 0 | 1 | 0 | 1 |
| 0 | 1 | 0 | 0 | 1 |
| 0 | 1 | 1 | 1 | 0 |
| 1 | 0 | 0 | 0 | 1 |
| 1 | 0 | 1 | 1 | 0 |
| 1 | 1 | 0 | 1 | 0 |
| 1 | 1 | 1 | 1 | 1 |

FIG. 10B illustrates example full adder 1050 circuit according to some embodiments of the invention. Its inputs are A (non-inverting), B (invertible, inverts when σ is high), and $c_i$ (carry). Its outputs are S (the sum of A+B) and $c_0$ (carry). FIG. 10B implements the truth table:

| σ | ci | A | B | co | S |
|---|---|---|---|---|---|
| 0 | 0 | 0 | 0 | 0 | 0 |
| 0 | 0 | 0 | 1 | 0 | 1 |
| 0 | 0 | 1 | 0 | 0 | 1 |
| 0 | 0 | 1 | 1 | 1 | 0 |
| 0 | 1 | 0 | 0 | 0 | 1 |
| 0 | 1 | 0 | 1 | 1 | 0 |
| 0 | 1 | 1 | 0 | 1 | 0 |
| 0 | 1 | 1 | 1 | 1 | 1 |
| 1 | 0 | 0 | 0 | 0 | 1 |
| 1 | 0 | 0 | 1 | 0 | 0 |
| 1 | 0 | 1 | 0 | 1 | 0 |
| 1 | 0 | 1 | 1 | 1 | 0 |
| 1 | 1 | 0 | 0 | 1 | 0 |
| 1 | 1 | 0 | 1 | 0 | 1 |
| 1 | 1 | 1 | 0 | 1 | 1 |
| 1 | 1 | 1 | 1 | 1 | 0 |

The circuits of FIGS. 10A and 10B are well-known in the art, and many variations are known, for example focusing on NAND logic or NOR logic, or avoiding XOR gates. An embodiment of the invention may comprise each one of those known in the art.

Whereas FIGS. 8-10 show examples of embodiments that implement ripple-carry adders in the CORDIC cell adder/subtractors, further embodiments include carry-lookahead adders, carry-save adders, and generally any type of binary adder known in the art that can add two multibit numbers. The different types of adders provide different balances between latency and chip area, and they all support the aspects of the present invention presented in this patent document. Yet further embodiments include any of these adders, including those that have hardwired fixed parameters and those that are shortened, wherein the adders and respective hardwired fixed parameters have been logically modified to implement their truth tables with a smaller gate count, or with less latency, or both. Even further embodiments include pipelining between some or all of the CORDIC cell stages to improve throughput given a certain latency.

FIG. 11 illustrates a method 1100 to perform a vector micro-rotation in a CORDIC cell according to an embodiment of the invention. Method 1100 comprises the following steps:

Step 1110—directly forwarding bits of x and y input signals to a first adder/subtractor and a second adder/subtractor to calculate x and y output bits, respectively, wherein the directly forwarding may comprise forwarding the bits of the x and y input signals via buffers but not via multiplexers.

Step 1120—forwarding a first part of bits from a z input signal to a shortened adder/subtractor, and a second part of the bits from the z input signal to a second part of bits from a z output signal. An embodiment forwards the second part of the bits directly, or via buffers.

Step 1130—in the shortened adder/subtractor, either adding or subtracting bits of a truncated rounded fixed parameter to or from the first part of the bits from the z input signal, to calculate a first part of the bits from the z output signal.

The CORDIC cell in method 1100 may include a shortened adder/subtractor with a ripple-carry adder, or any other adder that is known in the art. The first and the second adder/subtractor may include a ripple-carry adder, a carry-lookahead adder, a carry-save adder, or any other adder that is known in the art. Each of the shortened adder/subtractor, the first adder/subtractor and the second adder/subtractor may have been logically optimized while preserving its truth table, for example to optimize for area, power, latency, and/or throughput, or for any other quality metric known in the art.

General

Although the description has been provided with respect to particular embodiments thereof, these particular embodiments are merely illustrative, and not restrictive. For example, all figures illustrate single-ended logic, whereas embodiments of the invention could, without loss of generality, include or be fully built with differential logic.

Any suitable logic technology can be used to implement the circuits of particular embodiments including CMOS, NMOS, PMOS, BiCMOS, bipolar, hetero junction bipolar (BJT), FinFET, nanowire, carbon-nanotube FET, etc. The invention may be implemented in dedicated circuits fabricated in a semiconductor material, or as temporary circuits programmed in a field-programmable gate array (FPGA). Particular embodiments may be implemented by using programmable logic devices, optical, chemical, biological, quantum or nanoengineered systems, etc. Other components and mechanisms may be used. In general, the functions of particular embodiments can be achieved by any means as known in the art.

It will also be appreciated that one or more of the elements depicted in the drawings/figures can also be implemented in a more separated or integrated manner, or even removed or rendered as inoperable in certain cases, as is useful in accordance with a particular application.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

The invention claimed is:

1. A COordinate Rotation DIgital Computer (CORDIC) with a first bit-width, the CORDIC comprising:
multiple stages of three-dimensional CORDIC cells capable of performing vector rotation, wherein at least one of the CORDIC cells comprises a reduced CORDIC cell with an xy-path and a z-path wherein:
bit-shifts in the xy-path are hardwired;
a z-path fixed parameter is truncated to a second bit-width that is smaller than the first bit-width;
a z-path adder/subtractor is shortened to the second bit-width;
the truncated fixed parameter is included in the shortened adder/subtractor;
a number of most significant bits of a reduced CORDIC cell z-input word is coupled to non-inverting inputs of the shortened adder/subtractor, wherein the number of most significant bits equals the second bit-width;
the shortened adder/subtractor provides a number of most significant bits of a reduced CORDIC cell output word, wherein the number of most significant bits equals the second bit-width; and
a number of least significant bits of the reduced CORDIC cell output word is coupled with a number of least significant bits of the reduced CORDIC cell input word, wherein the number of least significant bits equals the first bit-width minus the second bit-width.

2. The CORDIC of claim 1, wherein:
the truncated fixed parameter is included in the shortened adder/subtractor by coupling bits of invertible inputs of the shortened adder/subtractor to respective logic levels representing the truncated fixed parameter.

3. The CORDIC of claim 1, wherein:
the truncated fixed parameter is rounded before truncation.

4. The CORDIC of claim 3, wherein:
the truncated fixed parameter is rounded from a value arctan($2^{-i}$) to a value $2^{-i}$.

5. The CORDIC of claim 1, wherein:
the shortened adder/subtractor is capable of adding only, and the truncated fixed parameter is included in the shortened adder/subtractor by coupling bits of non-inverting inputs of the shortened adder/subtractor to respective bit levels provided by a sign bit value and by an inverted value of the sign bit.

6. The CORDIC of claim 1, wherein:
the shortened adder/subtractor includes a ripple-carry adder.

7. The CORDIC of claim 1, wherein:
the shortened adder/subtractor includes a carry-lookahead adder.

8. The CORDIC of claim 1, wherein:
the shortened adder/subtractor includes a carry-save adder.

9. The CORDIC of claim 1, wherein:
the shortened adder/subtractor has been logically optimized, while preserving its truth table, to include fewer gates.

10. The CORDIC of claim 1, wherein:
the shortened adder/subtractor has been logically optimized, while preserving its truth table, to decrease latency.

11. The CORDIC of claim 1, wherein:
the shortened adder/subtractor has been logically optimized, while preserving its truth table, to decrease power.

12. The CORDIC of claim 1, wherein:
a least significant bit of the reduced CORDIC cell output word is coupled with a least significant bit of the reduced CORDIC cell input word via a buffer cell.

13. The CORDIC of claim 1, wherein:
two or more of the multiple stages of three-dimensional CORDIC cells are separated by pipeline registers to increase a CORDIC throughput rate.

14. The CORDIC of claim 1, wherein:
at least one of the CORDIC cells comprises a full CORDIC cell with an xy-path and a z-path wherein:
bit-shifts in the xy-path are hardwired; and
a z-path fixed parameter is included in the shortened adder/subtractor.

15. A method to perform a vector micro-rotation in a CORDIC cell, comprising:
directly forwarding bits of x-input and y-input signals to a first adder/subtractor and a second adder/subtractor to calculate x-output and y-output bits, respectively, wherein the directly forwarding may comprise forwarding the bits of the x-input and y-input signals via buffers but not via multiplexers;
forwarding a first part of bits from a z-input signal to a shortened adder/subtractor, and a second part of the bits from the z-input signal to a second part of bits from a z-output signal, wherein the forwarding the second part of the bits is directly, and wherein the forwarding directly may comprise forwarding the second part of the bits via buffers; and
in the shortened adder/subtractor, one of adding bits of a truncated rounded fixed parameter to and subtracting bits of the truncated rounded fixed parameter from the first part of the bits from the z-input signal, to calculate a first part of the bits from the z-output signal.

16. The method of claim 15, wherein:
the shortened adder/subtractor includes a ripple-carry adder.

17. The method of claim 15, wherein:
the first adder/subtractor includes a carry-lookahead adder.

18. The method of claim 15, wherein:
the first adder/subtractor includes a carry-save adder.

19. The method of claim 15, wherein:
the shortened adder/subtractor has been logically optimized while preserving its truth table.

20. The method of claim 15, wherein:
the first adder/subtractor has been logically optimized while preserving its truth table.

\* \* \* \* \*